April 20, 1965     A. S. KROTZ     3,179,400
TORSION SPRING

Filed June 11, 1963     2 Sheets-Sheet 1

INVENTOR.
Alvin S Krotz
BY Ralph Hammar
Attorney

April 20, 1965  A. S. KROTZ  3,179,400
TORSION SPRING
Filed June 11, 1963  2 Sheets-Sheet 2

INVENTOR.
Alvin S Krotz
BY Ralph Hammar
Attorney

United States Patent Office 3,179,400
Patented Apr. 20, 1965

3,179,400
TORSION SPRING
Alvin S. Krotz, Erie, Pa., assignor to Lord Manufacturing Company, Erie, Pa., a corporation of Pennsylvania
Filed June 11, 1963, Ser. No. 287,118
4 Claims. (Cl. 267—57.1)

This invention is a torsion spring having a plurality of conical layers of elastomer of radially increasing thickness, each sandwiched between and bonded to rigid conical shims of radially decreasing thickness. The shims restrain bulging under compression thrust and distribute the torsion load uniformly throughout the layers of elastomer. One use of the spring is in wheel suspensions.

Figures 1, 2:
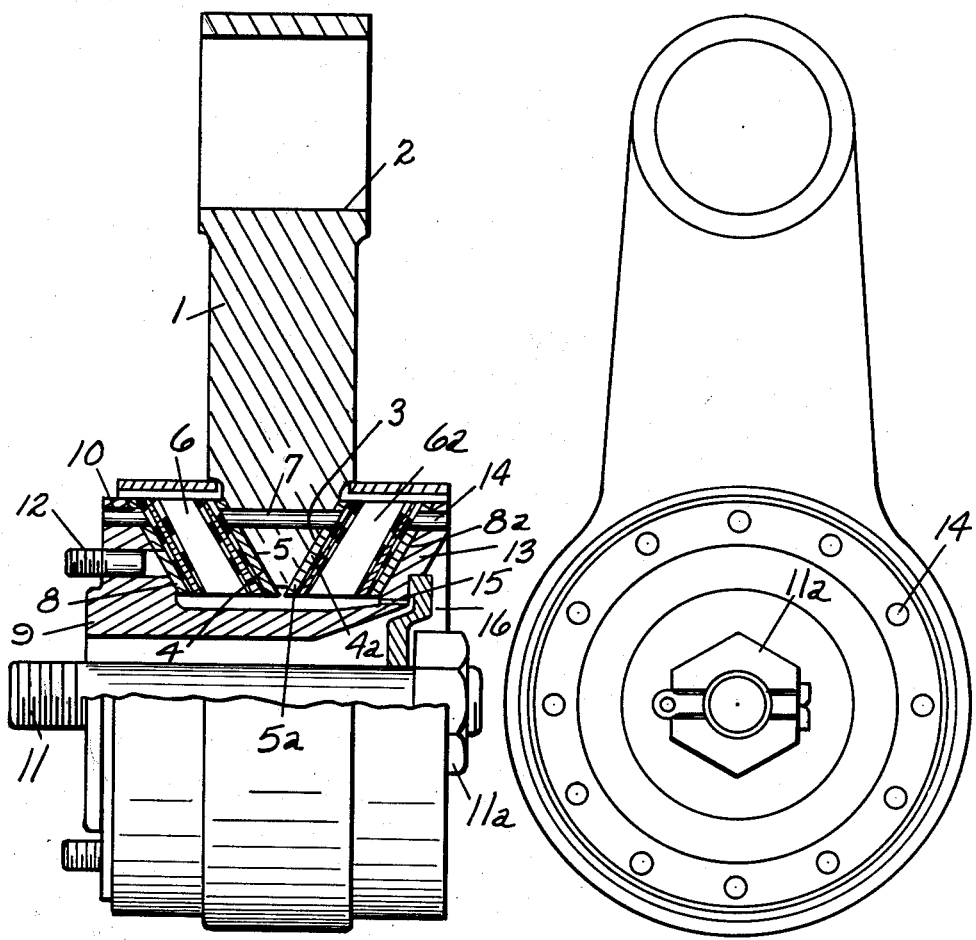
Figure 3:
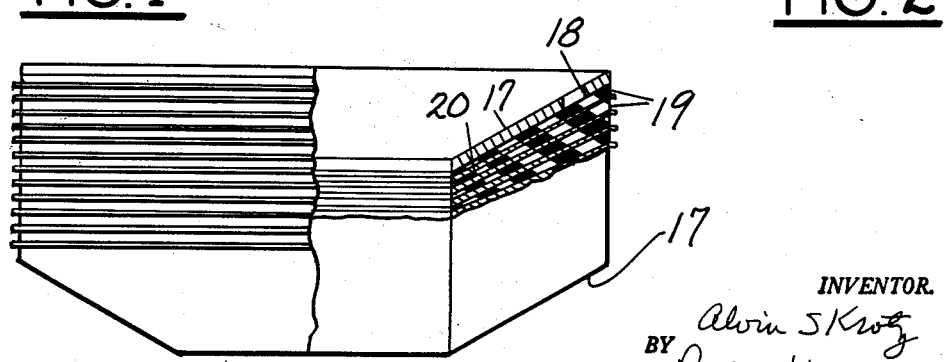
Figure 4:
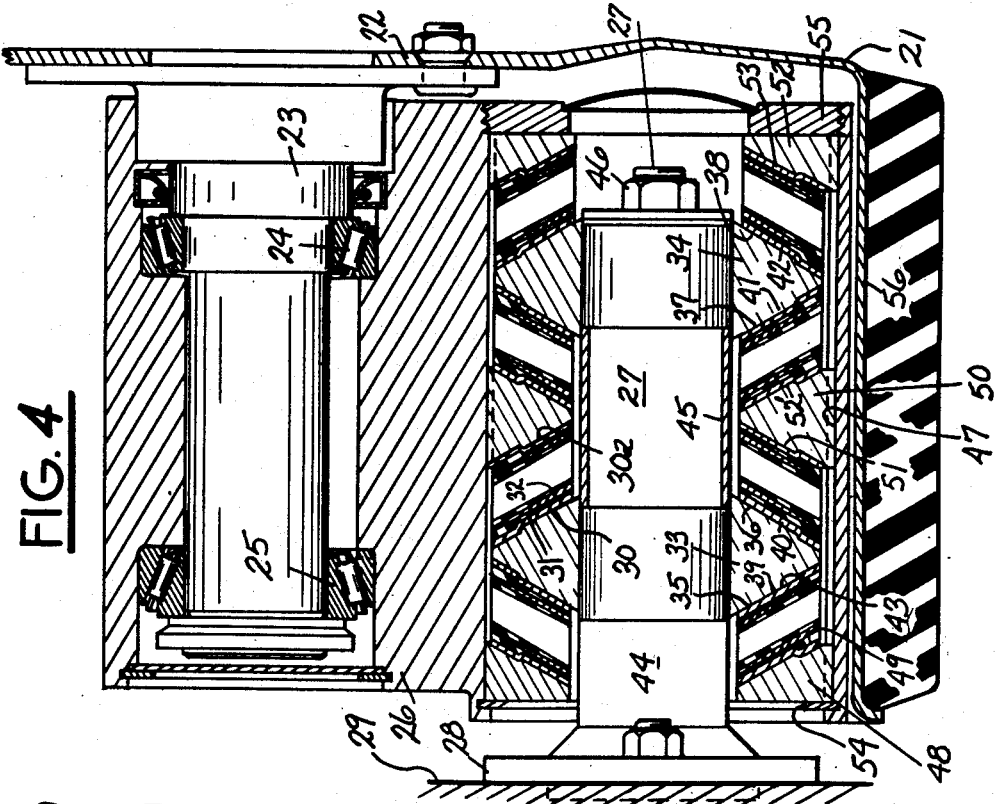
Figure 5:
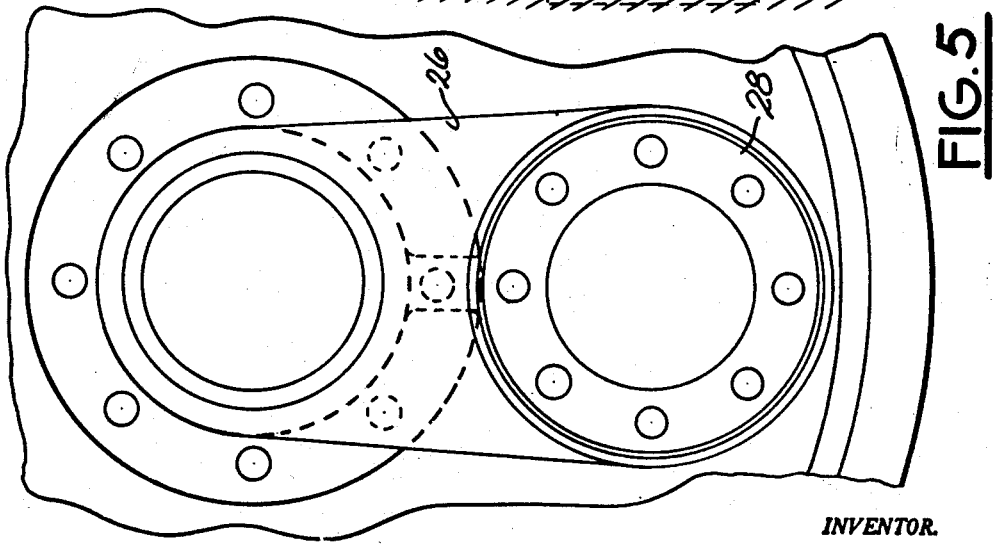

In the drawing, FIG. 1 is a plan view, partly in section, of a torsion spring applied to a wheel suspension; FIG. 2 is an end view; FIG. 3 is an edge view of one of the torsion springs, partly in section; FIG. 4 is a section through a modification in which the torsion spring wheel suspension is mounted within the wheel; and FIG. 5 is a fragmentary end view of the FIG. 4 suspension.

In the drawing, 1 indicates the torsion arm having an eye 2 at one end to be fixed to a wheel supporting axle and having an eye 3 at the opposite end with converging conical surfaces 4, 4a to which end plates (load transmitting members 5, 5a of torsion spring members 6, 6a are keyed by pins 7. At the opposite ends of the torsion springs are similar conical end plates 8 and 8a (load receiving members). The end plate 8 is keyed to a hub 9 by pins 10. The torsion springs are coaxial with and telescoped over the hub. The hub is bolted to the supporting structure by a stud 11 and is nonrotatably keyed to the supporting structure by pins 12. The end plate 8a is keyed to a flange 13 by pins 14 corresponding to the pins 7 and 10. The flange 13 is keyed to the hub 9 at 15. A washer 16 bears against the outer end of the flange 13 and places the springs under axial compression when the nut 11a of the stud 11 is tightened.

The springs 6 and 6a are preferably of identical construction, each comprising a pair of axially spaced parallel conical end plates 17 with circumferentially spaced holes 18 for pins 7, 10 and 14, as the case may be. Between the end plates 17 are a plurality of layers 19 of elastomer separated from each other by an intervening shim 20 of suitable structural material such as, for example, metal, fiberglass reinforced plastic, etc. The axial thickness of each of the conical layers 19 of elastomer increases radially and the axial thickness of each of the conical shims 20 decreases radially so that the sum of the axial thickness of a layer of elastomer and one of the shims is constant at any radius. This permits stacking of multiple layers of elastomer and shims without changing the cone angle. The variation in the thickness of the elastomer has the further advantage of making the shear stress uniform throughout the elastomer. The shims are closely spaced from each other (e.g., 30–60 mils), preventing bulging of the elastomer under compression load. This prevents cocking of the torsion springs with resultant misalignment. Because the elastomer is substantially incompressible and is confined by the shims, the torsion springs are effectively rigid under compression load while quite soft in shear. As an example, in the wheel suspension illustrated, under a load which causes the torsion spring to twist through an angle of from 30° to 40° the cocking or tilting of the axis of the wheel will be less than ¼°.

The wheel suspension of FIGS. 1 and 2 has the torsion spring outside the wheels. FIGS. 4 and 5 show a wheel suspension in which the torsion springs and arm are mounted within the rim of the wheel.

The wheel 21 has a hub 22 fixed to a shaft 23 carried by bearings 24 and 25 in one end of a wheel support arm 26. The other end of the wheel support arm is carried on a stud 27 extending from a plate 28 fixed to the supporting structure 29. Spaced along the stud 27 are two pairs of conical torsion springs, each of these spring members being of identical construction. Each spring member comprises axially spaced conical end plates 30, 30a between which are arranged a plurality of conical layers 31 of elastomer and intervening conical shims or spacers 32. The axial thickness of the layers 31 of elastomer increases radially while the axial thickness of the conical spacers 32 decreases radially so that the sum of the axial thickness of the layers of elastomer and spacers remains constant. The end plates 30, 30a and the intervening layers of elastomer and spacers are bonded together.

Keyed to the stud 27 are axially spaced hubs 33 and 34 with conical faces 35, 36, 37, 38 keyed to the adjacent end plates 39, 40, 41, 42 by keying projections 43. This non rotatably fixes the end plates 39–42 to the stud 27. The hubs 33, 34 are clamped between spacers 44, 45 by a nut 46 screwed onto the outer end of the stud 27. Adjacent the support 28 is a member 48 keyed to a socket 47 in the lower end of the wheel support arm 26 and to the end plate 49. At the center of the socket 47 is a member 50 keyed to the socket and to end plates 51 and 52. At the outer end of the socket 47 is a member 52' keyed to the socket and to the end plate 53. The members 48, 50 and 52 are clamped between snap ring 54 at the end of the socket 47 adjacent the support 28 and a nut 55 at the opposite end of the socket. The entire wheel supporting assembly is located within the rim 56 of the wheel. The torsion springs provide a connection between the wheel and the supporting structure which is soft in a vertical direction where the loads are accommodated by torsion but is stiff in axial and cocking directions where the load is taken by compression. This maintains the wheel alignment while providing a resilient support.

Both wheel supports are adapted to amphibious vehicles because the wheel support and the attaching bolts are entirely outside the supporting structure (the hull of the vehicle), thereby eliminating the need for seals. The torsion spring also lends itself to commercial applications such as the suspension of commercial trailer wheels in which use no transverse axle is required and each wheel can be located at many transverse or longitudinal positions on the frame or chassis.

What is claimed as new is:

1. In combination, a wheel having a recessed rim, a wheel support arm having both ends of the arm within said recess, one end of the arm being provided with journal means for the wheel, a pair of axially spaced torsion springs within the other end of the arm, each spring having load transmitting and load receiving members having opposed axially spaced conical surfaces generally parallel to each other, alternate conical layers of elastomer and rigid material sandwiched between and bonded to said members and to each other, the members of one spring diverging from the members of the other spring, means for connecting the other end of the arm to the load transmitting members of said springs, and means for connecting the load receiving members of the springs to a supporting structure.

2. In combination, a pair of axially spaced torsion springs, each spring having load transmitting and load receiving members having opposed axially spaced conical surfaces generally parallel to each other, alternate conical layers of elastomer and rigid material sandwiched between and bonded to said members and to each other, said layers of elastomer having radially increasing axial thickness and said layers of rigid material having radially decreasing axial thickness, the members of one spring diverging from the members of the other spring, a wheel support arm, means for connecting one end of the arm to a wheel axle and the opposite end to the load transmitting members of said springs, and means for connecting the load receiving members of the springs to a supporting structure.

3. In combination with an amphibious vehicle or the like having a hull, a wheel, a wheel support arm having one end provided with journal means for the wheel, a hub having one end fixed to the hull and the other end projecting from the outer surface of the hull, a pair of axially spaced torsion springs coaxial with and telescoped over the hub, each spring having load transmitting and load receiving members having opposed axially spaced conical surfaces generally parallel to each other, alternate conical layers of elastomer and rigid material sandwiched between and bonded to said members and to each other, the members of one spring diverging from the members or the other spring, means for connecting the opposite end of the arm to the load transmitting members of said springs, and means for connecting the load receiving members of the springs to the hub.

4. A road vehicle having a load carrying structure supported from a road wheel by a wheel support arm having one end providing with journal means for the wheel, a hub having one end fixed to said structure and having the other end projecting from said structure, the other end of the arm being telescoped over the other end of the hub, at least one pair of axially spaced conic springs, each spring having axially spaced conic load transmitting and load receiving members coaxial with and telescoped over the hub and generally parallel to each other and the apex of one spring of the pair being opposed to the apex of the other spring of the pair, each conic spring comprising alternate conic layers of elastomer and rigid material sandwiched between and bonded to load transmitting and load receiving members and to each other, means for attaching the load receiving members to said hub and the load transmitting members to the other end of the wheel support arm.

References Cited by the Examiner

UNITED STATES PATENTS

| 2,167,508 | 7/39 | Herold | 267—57.1 X |
| 2,203,342 | 6/40 | Sloman et al. | 267—57.1 |
| 2,254,452 | 9/41 | Ronning | 180—71 X |
| 2,444,759 | 7/48 | Swennes | 267—57.1 X |
| 2,650,668 | 9/53 | Hopkins | 180—71 |
| 2,759,759 | 8/56 | Blackwood | 267—63 X |
| 2,900,182 | 8/59 | Hinks | 267—57.1 |
| 2,914,017 | 11-59 | Ruger | 115—1 |
| 3,057,319 | 10/62 | Wagner | 115—1 |
| 3,071,422 | 1/63 | Hinks | 267—57.1 X |

OTHER REFERENCES

Davids, German application 1,007,202, printed April 25, 1957 (Kl 63h 2/02).

ARTHUR L. LA POINT, *Primary Examiner.*